United States Patent
Moraines et al.

(10) Patent No.: US 8,932,009 B2
(45) Date of Patent: Jan. 13, 2015

(54) DEVICE FOR SUPPORTING A TURBINE RING, TURBINE HAVING SUCH A DEVICE, AND TURBINE ENGINE HAVING SUCH A TURBINE

(75) Inventors: Christophe-Olivier Moraines, Bayonne (FR); Frederic Philippe Jean-Jacques Pardo, Pau (FR)

(73) Assignee: TURBOMECA, Bordes (FR)

( * ) Notice: Subject to any disclaimer, the term of this patent is extended or adjusted under 35 U.S.C. 154(b) by 522 days.

(21) Appl. No.: 13/393,934

(22) PCT Filed: Sep. 2, 2010

(86) PCT No.: PCT/EP2010/062914
§ 371 (c)(1),
(2), (4) Date: Mar. 2, 2012

(87) PCT Pub. No.: WO2011/026921
PCT Pub. Date: Mar. 10, 2011

(65) Prior Publication Data
US 2012/0163957 A1   Jun. 28, 2012

(30) Foreign Application Priority Data
Sep. 4, 2009   (FR) .................................. 09 56049

(51) Int. Cl.
*F01D 11/08*   (2006.01)
*F01D 11/24*   (2006.01)
*F01D 25/24*   (2006.01)

(52) U.S. Cl.
CPC .............. *F01D 11/24* (2013.01); *F01D 25/246* (2013.01); *Y02T 50/67* (2013.01); *F05D 2240/11* (2013.01); *F05D 2230/60* (2013.01); *Y02T 50/671* (2013.01)
USPC ...................... 415/173.1; 415/213.1; 415/116

(58) Field of Classification Search
CPC ......... F01D 11/08; F01D 11/12; F01D 25/24; F05D 2240/11
USPC .................................... 415/173.1, 116, 213.1
See application file for complete search history.

(56) References Cited

U.S. PATENT DOCUMENTS 3,790,299 A    2/1974 Sidler
4,786,232 A    11/1988 Davis et al.
(Continued)

FOREIGN PATENT DOCUMENTS

FR          2 159 378        6/1973

OTHER PUBLICATIONS

International Search Report Issued Nov. 2, 2010 in PCT/EP10/62914 Filed Sep. 2, 2010.

*Primary Examiner* — Ninh H Nguyen
(74) *Attorney, Agent, or Firm* — Oblon, Spivak, McClelland, Maier & Neustadt, L.L.P.

(57) ABSTRACT

A device for supporting a ring of a gas turbine, the ring configured to surround mobile blades of the turbine which are driven by a gas stream flowing upstream to downstream. The device includes at least one upstream hook facing upstream, to be housed in an upstream groove of the ring, opened toward the downstream direction, and at least one downstream hook facing downstream, to be housed in a downstream groove of the ring, opened toward the upstream direction. The hooks are protected and clearances at apexes of the blades are more easily controlled. The device further includes, upstream from the upstream hook, a mechanism injecting cooling gas to cool the upstream hook and/or includes, downstream from the downstream hook, a mechanism injecting a cooling gas to cool the downstream hook.

8 Claims, 2 Drawing Sheets

(56) References Cited

U.S. PATENT DOCUMENTS

| | | |
|---|---|---|
| 6,402,466 B1 * | 6/2002 | Burdgick et al. .......... 415/173.3 |
| 6,702,550 B2 * | 3/2004 | Darkins et al. ................ 415/139 |
| 7,600,967 B2 * | 10/2009 | Pezzetti et al. ............. 415/173.1 |
| 8,480,353 B2 * | 7/2013 | Koyabu et al. ................ 415/116 |
| 2005/0232752 A1 | 10/2005 | Meisels |

* cited by examiner

DEVICE FOR SUPPORTING A TURBINE RING, TURBINE HAVING SUCH A DEVICE, AND TURBINE ENGINE HAVING SUCH A TURBINE

The invention relates to the field of gas turbines and more specifically to turbine rings and their supporting devices.

A turboshaft engine for an aircraft such as an airplane or a helicopter generally comprises, from upstream to downstream in the direction of gas flow, a fan, one or more compressor stages, for example a low pressure compressor and a high pressure compressor, a combustion chamber, one or more turbine stages, for example a high pressure turbine and a low pressure turbine, and a gas exhaust nozzle. One turbine may correspond to each compressor, the two being connected by a shaft, thus forming, for example, a high pressure spool and a low pressure spool; in a different configuration, the turboshaft engine may comprise a first turbine connected to a compressor and a second "free" turbine, which is connected to a shaft for example driving a helicopter rotor (the first turbine, connected to the compressor, is then generally designated the high pressure turbine).

The phrase "high pressure" will hereinafter be denoted by the acronym "HP" and the phrase "low pressure" by the acronym "BP".

The HP turbine is located at the outlet of the combustion chamber. It comprises one or more stages of blades, each stage generally comprising, in a known manner, a stationary blade wheel known as HP turbine nozzle and a moving blade wheel. The moving blade wheel is driven in rotation about the axis of the turboshaft engine by the gas flow leaving the combustion chamber and is integral for rotation with the HP shaft of the turboshaft engine, which is itself integral with the moving blade wheels of the HP compressor. The gas stream at the level of the moving blade wheel of the HP turbine is defined, externally, by a casing in the form of a ring, extending at the periphery of the moving blades and conventionally denoted by the phrase "turbine ring"; this ring may be in one piece or sectorized into ring sectors; hereinafter, unless otherwise specified, the term "ring" will cover both of these two possibilities, that is to say either a one-piece ring or a ring sectorized into ring sectors. The ring is supported by a part known as ring support and connected to the stationary structure of the turboshaft engine.

In order to allow the moving blades to rotate, clearance is provided between the radial ends of the moving blades and the stationary turbine ring, said clearance extending opposite the radial ends of the blades. The larger this clearance is, the poorer the efficiency of the HP turbine and therefore of the turboshaft engine, since a proportion of the gas flow leaving the combustion chamber flows into this clearance without contributing to the rotational drive of the moving blade wheel of the turbine.

The HP turbine zone is exposed to significant thermal stresses, in particular due to its position downstream of the combustion chamber. The parts in this zone are exposed to at least four distinct thermal stresses:
thermal convection of a cooling gas flow originating from the compressor;
thermal conduction arising from heat transfers, from the gas stream, through the parts in contact with one another;
thermal radiation originating from the hot parts of the turboshaft engine and in particular from the combustion chamber and the gas stream at the level of the HP turbine and
significant thermal convection from the gas flow of the stream, which may be exacerbated when a proportion of the flow escapes from the stream and gets in at the level of the join between the turbine ring and its supporting part on the outside of the ring (this is then known as "reingestion" of the gas stream or bypass, which causes thermal disruption to the turbine ring as well as a loss of engine efficiency, since a proportion of the gases from the main stream does not follow its normal course but instead passes via the bypass).

These various thermal stresses result in differential levels of expansion (between the various parts involved) and temperature gradients within the static parts which are difficult to manage. In particular, the effects associated with thermal convection due to gas reingestion outside the stream are complex to model. This phenomenon becomes all the more significant given that the developments in engine power associated with the aim of reducing fuel consumption are bringing about an increase in the temperatures of the gases leaving the combustion chamber of today's turboshaft engines.

Various means have been suggested for controlling the clearance between the blade tips and the turbine ring. Document EP 1,475,516, for example, proposes a structural casing (onto which is attached the ring supporting part) having a certain elasticity, the shape of which thus depends on the pressures to which it is subjected in different engine operating modes, thus permitting adjustment of clearance at the level of the blade tips.

It is an object of the present invention to propose a supporting device for a turbine ring which enables better control of turbine blade tip clearance and improved ruggedness of parts as they age in order to ensure the stability of gas stream characteristics over time.

To this end, the invention relates to a supporting device for a ring of a gas turbine, the ring being intended to enclose moving blades of the turbine driven by a gas flow flowing from upstream to downstream, the device comprising at least one upstream hook, facing upstream, intended to be accommodated in an upstream groove of the ring, which groove is open in the downstream direction, and at least one downstream hook, facing downstream, intended to be accommodated in a downstream groove of the ring, which groove is open in the upstream direction, the device comprising, upstream of the upstream hook, means (for example orifices) for injecting cooling gases for cooling the upstream hook and/or comprising, downstream of the downstream hook, means (for example orifices) for injecting cooling gases for cooling the downstream hook.

Thanks to the invention, the hooks of the supporting device are each accommodated in a groove of the ring and are therefore protected from the gas flow by the ring itself, thus ensuring that they retain a constant shape whatever the turbine operating mode, since the changes in temperature which arise have less of an impact on them. Ensuring the integrity of the hooks in this manner facilitates and thus improves control of the clearance between the blade tips and the ring, since change and integrity are better managed over time. The means for injecting cooling gases better ensure the thermal integrity of the upstream hook and/or of the downstream hook, thus moreover enabling optimization of transient thermal operating modes.

According to an advantageous embodiment, the cooling gases are at a pressure which is greater than or equal to the pressure of the gases of the gas flow on the upstream side of the moving blades of the turbine. In this way, the cooling gases also act as a barrier to possible reingestion of the gases from the gas flow via the upstream side of the ring.

According to one advantageous embodiment, the cooling gases are at a pressure which is greater than or equal to the pressure of the gases of the gas flow on the downstream side of the moving blades of the turbine. In this way, the cooling gases also act as a barrier to possible reingestion of the gases from the gas flow via the downstream side of the ring.

According to one advantageous embodiment, the device is arranged to form a pressurized cavity supplied with cooling gases between the two hooks. The hooks are thus better protected given that the cavity protects them from the gas flow of the turbine. In particular, the pressure of the pressurized cavity is greater than or equal to the pressure of the gas flow of the upstream side of the moving blades of the turbine, thus avoiding reingestion of gas originating from the gas flow. The formation of such a pressurized cavity is permitted by the particular shape of the ring; it is improved by the presence of possible sealing means such as those set out below.

According to one advantageous embodiment, the upstream groove of the ring has a curvilinear surface for contact with the upstream hook (in axial section, relative to the axis of the ring which is the axis of the turboshaft engine).

According to one advantageous embodiment, the downstream groove of the ring has a curvilinear surface for contact with the downstream hook (in axial section, relative to the axis of the ring which is the axis of the turboshaft engine).

According to one advantageous embodiment, the device comprises at least one upstream seal arranged to ensure gas-tightness between the ring and the upstream hook, the upstream seal being accommodated in the upstream groove of the ring. Such a seal makes it possible to improve the gas-tightness of the device, which is particularly advantageous in the case where a pressurized cavity is formed between the upstream and downstream hooks and/or in the case where the upstream cooling gases are intended to form a barrier to the gases of the gas flow of the turbine upstream of the upstream hook. Such a seal may furthermore contribute to maintaining the ring in axial and radial position.

According to one advantageous embodiment, the device comprises at least one downstream seal arranged to ensure gas-tightness between the ring and the downstream hook, the downstream seal being accommodated in the downstream groove of the ring. Such a downstream seal provides the same advantages as an upstream seal, on the downstream side.

According to a preferred embodiment, the upstream seal and/or the downstream seal is a seal of the braided seal type of refractory material. Such a seal further improves tightness while advantageously contributing to maintaining the ring in axial and radial position.

According to one advantageous embodiment, the device comprises, on the upstream side of the ring, a peripheral seal which is gas-tight to the gases flowing on the outer side of a distributor casing of the turbine extending upstream of the moving blades.

According to an advantageous embodiment, the device comprises an upstream supporting part comprising the upstream hook and a downstream supporting part, which is separate from the upstream supporting part, comprising the downstream hook.

According to one particular embodiment in this case, the upstream and downstream supporting parts are in one piece and annular and the ring is sectorized into at least two ring sectors.

It is preferable in this case for the upstream and downstream supporting parts to be arranged to be mounted with the ring by sliding the supporting parts one on the other and by shrink fitting, which guarantees the axial and radial positioning of the ring. This mounting is facilitated by the presence of upstream and downstream seals such as those presented above, said seals being able to contribute to maintaining the ring in radial and axial position on its support.

At least one sealing washer is arranged at the interface between surfaces in contact with two successive ring sectors, in a groove provided for this purpose. According to one particular embodiment, this washer is arranged to allow cooling gases to escape from a pressurized cavity formed between the hooks towards the gas flow; such escape prevents gas from circulating in the opposite direction (that is to say, an escape of gas outside the turbine gas flow) and allows purging of the cooling gases.

According to another particular embodiment, the ring is in one piece and annular, the downstream supporting part is in one piece and annular and the upstream supporting part is sectorized into at least two supporting part sectors.

According to one particular embodiment in this case, the minimum radial diameter of the downstream hook is greater than the minimum radial diameter of the upstream hook. Such a difference in diameter facilitates mounting of the different elements between them.

The invention additionally relates to a gas turbine ring intended to enclose moving blades of the turbine driven by a gas flow flowing from upstream to downstream, the ring being intended to be supported by the supporting device presented above, the ring comprising an upstream groove, open in the downstream direction, intended to receive at least one upstream hook, facing upstream, of the supporting device, and a downstream groove, open in the upstream direction, intended to receive at least one downstream hook, facing downstream, of the supporting device.

The invention also relates to a turbine comprising the supporting device presented above.

The invention also relates to a turboshaft engine (or a turbojet engine) comprising such a turbine.

The invention will be better understood with reference to the following description of the preferred embodiment of the invention, with reference to the appended sheets of drawings, in which.

Figure 1:
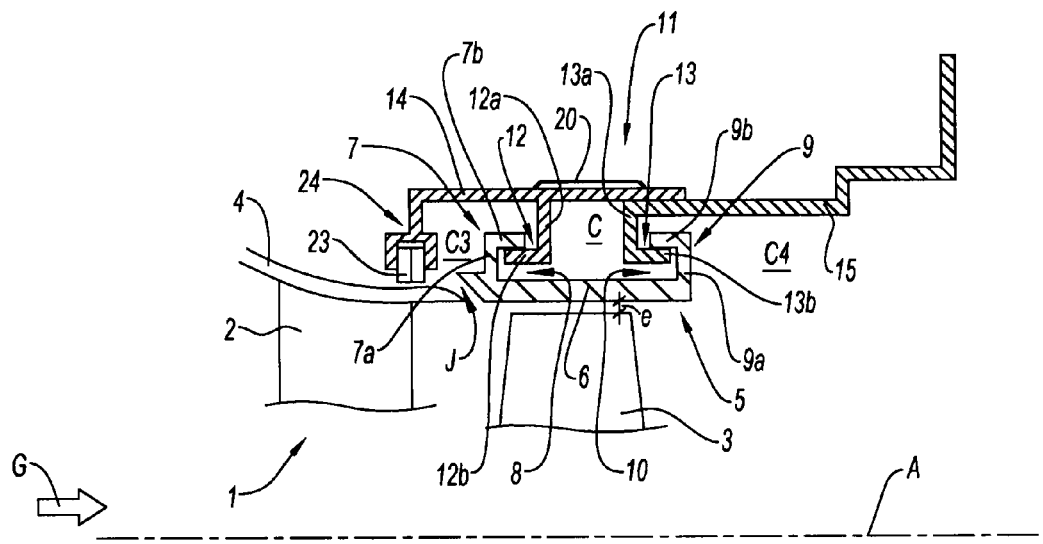
FIG. 1 is a schematic view in axial section of a turbine ring and of its supporting device according to a first preferred embodiment of the invention.

With reference to FIG. 1, a turboshaft engine, intended for example for use in an airplane or a helicopter, comprises, from upstream to downstream in the direction of flow of the gases, a fan, a BP compressor, an HP compressor, a combustion chamber, an HP turbine 1, a BP turbine and a gas exhaust nozzle. The BP turbine is connected at the BP compressor by a BP shaft, forming a BP spool, while the HP turbine is connected to the HP compressor by an HP shaft, forming an HP spool.

The invention will be described, with reference to the embodiments thereof in FIGS. 1 and 2 on the one hand and 3 to 4c on the other, in relation to the HP turbine 1 of a turboshaft engine of the type presented above. The invention applies, of course, to any turbine subjected to thermal stresses, in particular to a turbine of a helicopter turboshaft engine comprising an HP turbine connected to an HP compressor and a free turbine connected to a shaft driving a rotor of the helicopter (the invention then preferably applying to the HP turbine but also to the free turbine). The invention may apply to other types of turbines.

The HP turbine 1 comprises a stationary blade wheel 2, known as an HP turbine nozzle, and a moving blade wheel 3 driven rotationally by a gas flow G which flows, in an upstream to downstream direction, from the combustion chamber. The moving blades 3 turn about an axis A which is the axis of the turboshaft engine.

The concepts of inner (or internal) and outer (or external) are defined relative to the axis A of the turboshaft engine, it being understood that being located or oriented on the inner (or internal) side means being located or oriented towards the axis A of the turboshaft engine. The concepts of radial and longitudinal are furthermore defined relative to the axis A of the turboshaft engine and the concepts of upstream and downstream relative to the direction of flow of the gases.

In a known manner, the gas stream at the level of the HP turbine 1 is defined, on the outer side, by an annular casing 4 (conventionally known as "outer meridian" by a person skilled in the art) to which are fixed the stationary blades 2 of the turbine nozzle and by a ring 5, known as a turbine ring 5, which is mounted downstream of the casing 4 and forms a casing enclosing the moving blades 3.

The turbine ring 5 is annular overall over its entire periphery, that is to say over 360°. In the embodiment in FIGS. 1 and 2, it is cut into a plurality of ring sectors 5 (in the case in point around ten sectors) which, juxtaposed end to end, form the entire ring 5; the ring is known as a sectorized ring 5.

Figure 2:
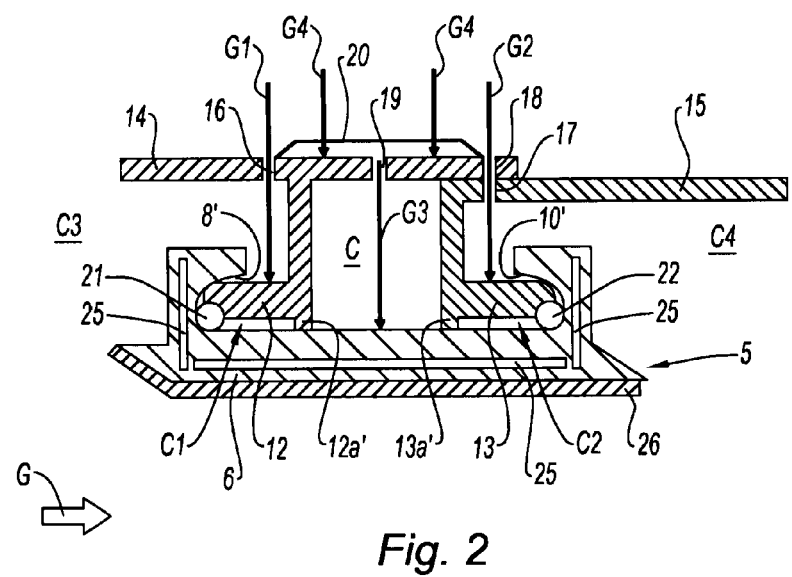
FIG. 2 is a detailed schematic view of the ring and of the supporting device of FIG. 1, showing the cooling gas flow.

In the remainder of the description of the embodiment of FIGS. 1 and 2, the shape of a ring sector 5 is described, it being understood that the ring 5 is axisymmetrical (it is a rotationally symmetrical element); to simplify the description, the concepts of ring 5 and ring sector 5 have thus been merged. In other words, the features stated for the structure of the ring apply to a one-piece ring or alternatively to a ring sectorized into ring sectors, it being understood that a ring sector is ultimately merely one portion of the ring, having the same shape as the overall ring, but in a sectorized manner, that is to say over a smaller circumferential extent.

The ring 5 comprises an inner wall 6 defining the outer limit of the gas stream; the radial tips of the blades 3 extend at a distance e from this wall 6, this distance corresponding to the clearance e between the blade tips 3 and the ring 4, which it is desired to be able to control to the best possible degree and manage over time. The ring 5 furthermore comprises an upstream shoulder 7 defining an upstream groove 8 and a downstream shoulder 9 defining a downstream groove 10.

The upstream groove 8 is open in the downstream direction; to this end, the upstream shoulder 7 comprises a radial wall 7a extending towards the outside from the inner wall 6 of the ring 5 and a longitudinal wall 7b extending in the downstream direction from the outer end of the radial wall 7a (in the case in point perpendicular thereto).

The downstream groove 10 is open in the upstream direction; to this end, the downstream shoulder 9 comprises a radial wall 9a extending towards the outside from the inner wall 6 of the ring 5 and a longitudinal wall 9b extending in the downstream direction from the outer end of the radial wall 9a (in the case in point perpendicular thereto).

The turboshaft engine comprises a supporting device 11 for the ring 5. This device 11 comprises an upstream hook 12, facing in the upstream direction, accommodated in the upstream groove 8 of the ring 5, and a downstream hook 13, facing in the downstream direction, accommodated in the downstream groove 10 of the ring 5; the ring 5 is thus supported and held in position by the hooks 12, 13.

More specifically, the hooks 12, 13 are annular in shape and, in the embodiment of FIGS. 1 and 2, in one piece over the entire periphery of the ring 5 (that is to say over the periphery of all the ring sectors 5).

In the embodiment shown, the hooks 12, 13 are axisymmetrical. Alternatively, the hooks 12, 13 may be of openwork construction and/or comprise a plurality of separate hooks distributed circumferentially.

The upstream hook 12 is supported by an upstream supporting part 14, of a longitudinal cylindrical shape overall (along the axis A of the turboshaft engine), which is connected to the stationary structure of the turboshaft engine in a manner which is not shown (for example by means of a fixing flange screwed to a complementary flange on the stationary structure). The hook 12 comprises a radial wall 12a extending towards the inside from the upstream supporting part 14 and a longitudinal wall 12b extending in the upstream direction from the inner end of the radial wall 12a (in the case in point perpendicular thereto).

The downstream hook 13 is supported by a downstream supporting part 15, of a longitudinal cylindrical shape overall (along the axis A of the turboshaft engine), which is connected to the stationary structure of the turboshaft engine in a manner which is not shown (for example by means of a fixing flange screwed to a complementary flange on the stationary structure). The hook 13 comprises a radial wall 13a extending towards the inside from the downstream supporting part 15 and a longitudinal wall 13b extending in the downstream direction from the inner end of the radial wall 13a (in the case in point perpendicular thereto).

The upstream hook 12 and downstream hook 13 are respectively accommodated in the upstream groove 8 and downstream groove 10 of the ring 5 to hold it in position and are thus protected thermally by the ring 5 itself, more specifically by its inner wall 6 and by the walls (7a, 7b), (9a, 9b) forming the shoulders 7, 9, providing the grooves 8, 10, respectively.

With reference to FIG. 2, the upstream groove 8 has a surface 8' for contact with the upstream hook 12; in the case in point, this contact surface 8' is curvilinear in shape in axial section, to allow stable positioning of the ring 5 on the upstream hook 12 irrespective of possible mounting inaccuracies due for example to manufacturing tolerances.

The downstream groove 10 has a surface 10' for contact with the downstream hook 13; in the case in point, this contact surface 10' is curvilinear in shape in axial section, to allow stable positioning of the ring 5 on the downstream hook 13, as explained above for the upstream hook 12.

The upstream supporting part 14 comprises cooling orifices 16 allowing the injection of cooling gases (coming for example from the compressor) from the outside of the upstream supporting part 14 towards the upstream hook 12, to cool the latter (the cooling gases also allow cooling of the upstream shoulder 7 of the ring 5); this upstream cooling gas flow is symbolized by arrow G1 in FIG. 2. The upstream hook 12, protected by the ring 5, is thus cooled, which further improves its thermal stability and makes it possible to control the radial movements of the axisymmetrical elements of the supporting device 11, thus facilitating control of the clearance e between the blade tips 3 and the ring 5, especially as the ring 5 is also cooled.

The downstream supporting part 15 comprises cooling orifices 17 allowing the injection of cooling gases (coming for example from the compressor) from the outside of the downstream supporting part 15 towards the downstream hook 13, to cool the latter (the cooling gases also allow cooling of the downstream shoulder 9 of the ring 5); this downstream cooling gas flow is symbolized by arrow G2 in FIG. 2. In the case in point, since the upstream supporting part 14 and downstream supporting part 15 overlap partially in the zone of the cooling orifices 17, the upstream supporting part 14 also has orifices 18 formed in it for passage of the cooling gases from the downstream hook 13. The downstream hook 13, protected by the ring 5, is thus cooled, which further improves its thermal stability and makes it possible to control the radial movements of the axisymmetrical elements of the supporting device 11, thus facilitating control of the clearance e between the blade tips 3 and the ring 5, especially as the ring 5 is also cooled.

Simultaneous cooling of the upstream hook 12 and downstream hook 13 is particularly advantageous: the ring 5 may thus be supported by means 12, 13 which are protected thereby and moreover cooled, that is to say exhibiting very good structural stability whatever the thermal fluctuations associated for example with changes in operating mode.

The radial walls 12a, 13a of the upstream hook 12 and downstream hook 13 are moreover, in the case in point, arranged to form, with a portion of the longitudinal wall of the upstream supporting part 14 and a portion of the longitudinal wall 6 of the ring 5, a pressurized enclosure C; it may be noted more specifically in FIG. 2 that the radial walls 12a, 13a of the hooks 12, 13 are each extended, at their inner end, by a lip 12a', 13a' contacting the longitudinal wall 6 of the ring 5; the contact lips 12a', 13a' are openwork radial walls.

The pressurized cavity C is supplied with cooling gases which are injected at the level of cooling orifices 19; this cooling gas flow is symbolized by arrow G3 in FIG. 2. The cooling gases cool the hooks 12, 13 as well as the ring 5 and in particular its longitudinal wall 6.

An annular perforated sheet 20 is mounted in the case in point on the outer side of the upstream supporting part 14, at the level of the pressurized cavity C, for cooling the upstream supporting part 14 by gas impingement (as symbolized by arrows G4) and to adjust the cooling gas flow rate G3 supplying the pressurized cavity C. The gas impingement provided by this sheet 20 makes it possible, in combination with the upstream cooling gas flow G1 and the downstream cooling gas flow G2, to control thermodynamically the radial movements of the axisymmetrical elements of the supporting device 11, thus making it possible to optimize the clearance e between the blade tips 3 and the ring 5.

An upstream O-ring seal 21 is mounted between the upstream end of the upstream hook 12 and the surface of the upstream groove 8 of the ring 5, on the inner side of said groove; together with the upstream contact lip 12a', the longitudinal wall 6 of the ring 5 and the upstream hook 12, said seal forms a cavity C1. Said seal 21 improves the tightness of the pressurized cavity C on the upstream side (the cavity C1 communicating with the pressurized cavity C via the apertures in the upstream contact lip 12a').

A downstream O-ring seal 22 is mounted between the downstream end of the downstream hook 13 and the surface of the downstream groove 10 of the ring 5, on the inner side of said groove; together with the downstream contact lip 13a', the longitudinal wall 6 of the ring 5 and the downstream hook 13, said seal forms a cavity C2. Said seal 22 improves the tightness of the pressurized cavity C on the downstream side (the cavity C2 communicating with the pressurized cavity C via the apertures in the downstream contact lip 13a').

The O-ring seals 21, 22 are in the case in point of the type known as "braided seals", that is to say they are each formed of a plurality of strands braided together, the strands being in the case in point formed of a refractory material which retains its mechanical characteristics at the high temperatures to which the ring 5 is subjected. In the embodiment described, each seal 21, 22 is sectorized in the same way as the ring sectors 5; alternatively, the seals 21, 22 may each extend over the entire circumference of the ring 5, between the different ring sectors 5.

The supporting device 11 for the ring 5 additionally comprises a seal 23 of the (metal) "segment seal" type, supported by an upstream flange 24 of the upstream supporting part 14. The segment seal 23 is in contact with an outer surface of the annular casing 4 of the distributor and ensures gas-tightness at this level.

The various elements of the ring 5 and of its supporting device 11, and in particular the cooling orifices 16, 17, 18, 19, are arranged such that the cooling gases G1, G2, G3 also fulfil a (pressure) barrier function relative to the gases of the gas flow G of the turbine 1, to prevent bypass of these gases, that is to say circulation of the gases of the gas flow G via the outer side of the ring 5, in other words reingestion of the gases of the gas flow G, which would be very detrimental to the efficiency of the turboshaft engine and also to the integrity of the static parts of the supporting device 11.

To this end, the ring 5 and its supporting device 11 are arranged such that the pressure of the gases upstream of the upstream hook 12, more specifically in a cavity C3 defined between the supporting flange 24 of the segment seal 23 and the upstream hook 12, is greater than the pressure of the gases of the gas flow G upstream of the turbine blades 3; for example, it may be equal to 6 bar while the pressure of the gases of the gas flow G upstream of the turbine blades 3 is equal to 5 bar. Thus, the cooling gases G1 tend to escape from the cavity C3 to the gas stream, via a clearance J between the annular casing 4 of the distributor and the ring 5, rather than escaping in the opposite direction. The hooks 12, 13 are thus protected from upstream gas reingestion, which prevents them from being subjected to the thermal convection which would result, thus facilitating control of the clearance 7 at the blade tips 3 since the differential levels of expansion are less pronounced.

It will be noted that the pressure of the gases upstream of the segment seal 23 is also greater than the pressure of the gases of the gas flow G upstream of the turbine blades 3, to prevent any gas backflow in the event of escape at the level of the segment seal 23; moreover, a slight amount of escape may be provided deliberately to provide still better protection for the ring hooks 12, 13 by a cooling gas flow coming from the upstream side of the segment seal 23.

Furthermore, the ring 5 and its supporting device 11 are arranged such that the pressure of the gases located in a cavity C4 located downstream of the downstream hook 13 is greater than the pressure of the gases of the gas flow G downstream of the turbine blades 3; for example, it may be equal to 3 bar whereas the pressure of the gases of the gas flow G downstream of the turbine blades 3 is equal to 2.5 bar. Thus, the cooling gases G1 tend to escape from the cavity C3 towards the gas stream (via a clearance which is not shown), rather than escaping in the opposite direction. The hooks 12, 13 are thus protected from downstream gas reingestion, which prevents them from being subjected to the thermal convection which would result, thus facilitating control of the clearance 7 at the blade tips 3 since the differential levels of expansion are less pronounced.

Furthermore, the ring 5 and its supporting device 11 are arranged such that the pressure of the gases in the pressurized cavity C is greater than or equal (in the case in point substantially equal) to the pressure of the gases of the gas flow upstream of the turbine blades 3, to complement the barrier to the gases of the gas flow G formed by the cavity C3 upstream of the upstream hook 12.

Since the cavities C3, C and C4 have pressures greater than the pressures of the gases of the gas stream flowing longitudinally at the level thereof, they form a barrier to these gases; this barrier protects the hooks 12, 13 and is therefore particularly advantageous for controlling the clearance e at blade tips 3. Furthermore, the cooling gases supplying these different cavities C3, C, C4 make it possible to cool the hooks 12, 13 and also the ring 5.

As shown in FIG. 2, and as is known, the ring sectors 5 further comprise sealing washers 25, at the interfaces between their ends in contact, said washers 25 extending for example in notches provided on the end surface of one or both of the ring sectors 5 in contact. These washers 25 are arranged to ensure maximum tightness between the pressurized cavity C and the gas stream of the gas flow G of the turbine and thus to prevent reingestion of stream gas in the pressurized cavity C; of course, since the tightness cannot be perfect, the device allows escape of the cooling gases from the pressurized cavity C into the gas stream of the gas flow G of the turbine 1, enabling purging of these cooling gases. Since the pressurized cavity C extends perpendicularly relative to the turbine blades 3 (that is to say at the same longitudinal level as the blades 3) and its pressure is equal to the pressure upstream of the blades 3, the pressure of the pressurized cavity is therefore greater than the pressure at the level of the blades 3 (the pressure decreases in the turbine from upstream to downstream); thus, the gases necessarily pass from the pressurized cavity C towards the gas stream of the turbine 1 and not vice versa.

To improve its thermal protection still further and to limit gas conduction towards the hooks 12, 13, the ring 5 is in the case in point covered with a coating 26 of ceramic material, on the inner side of its longitudinal wall 6.

Mounting of the ring 5 on its supporting device 11 will now be described. Said mounting is effected by sliding the upstream supporting part 14 and downstream supporting part 15 relative to one another and by shrink fitting. More specifically, the upstream supporting part 14 is heated (for example to a temperature of 100° C.) and moved by sliding such that the upstream hook 12 and downstream hook 13 are close to one another or indeed in contact with one another; this is possible because the supporting parts 14, 15 are telescopic, the radius of the longitudinal wall of the upstream supporting part 14 being slightly greater than the radius of the longitudinal wall of the downstream supporting part 15. The ring sectors 5 are then mounted on the downstream hook 13 (which is accommodated in the downstream grooves 10 thereof). The upstream supporting part is then moved in the upstream direction until it abuts against the upstream hook 12 in the upstream groove 8 of the ring 5; in this position, the upstream hook 12 abuts against the surface 8' of the upstream groove by the outer upstream corner of its longitudinal wall 12b and against the upstream braided seal 21 by the inner upstream corner of its longitudinal wall 12b; furthermore, the downstream hook 13 abuts against the surface 10' of the downstream groove by the outer downstream corner of its longitudinal wall 13b and against the downstream braided seal 22 by the inner upstream corner of its longitudinal wall 13b. In a final stage, the assembly is allowed to cool, which brings about a close fit between the various parts, by shrink fitting of the upstream supporting part 14 (the radius of its longitudinal wall diminishing on cooling) on the downstream supporting part 15, in a manner the general principle of which is known.

The segment seal 23 is mounted subsequently, for example by adhesive bonding, the adhesive bonding means disappearing in operation.

A second embodiment of the ring and of its supporting device will be described in relation to FIGS. 3 and 4a to 4c. This embodiment is very similar to the previous embodiment and for this reason, in order to simplify the description, the same reference signs are used for those turbine elements of FIGS. 3 and 4a to 4c which are of identical, equivalent or similar structure or function to those of the turbine elements of FIGS. 1 and 2. Moreover, the description of the turbine in FIGS. 1 and 2 is not repeated in its entirety, this description applying to the turbine in FIGS. 3 and 4a to 4c in the absence of incompatibilities. Only the significant structural and functional differences will be described.

The main difference in the second embodiment is that the ring 5 is in one piece and therefore forms a complete ring consisting of a single axisymmetrical part, over 360° (in other words, it is not sectorized). Furthermore, the downstream supporting part 15 is likewise in one piece over the entire periphery (360°), whereas the upstream supporting part 14 is sectorized, that is to say that it is cut into a plurality of upstream supporting part 14 sectors (in the case in point around ten sectors).

As before, the ring 5 is supported by an upstream hook 12 and downstream hook 13 accommodated in upstream 8 and downstream 10 grooves in the ring 5, with the same advantages. Means for injecting cooling gases (not shown) are provided for cooling the hooks 12, 13 as well as the ring 5, which controls the clearance e at the blade tips; they supply pressurized cavities C3, C, C4; as before, these injection means are arranged so as to allow the cooling gases to fulfil a barrier function relative to the gases of the gas flow G of the turbine 1, to prevent them from circulating on the outer side of the ring 5; to this end, the pressures of the gases on the outer side of the ring 5 are greater than the corresponding pressures of the gas flow G of the turbine 1.

Figure 3:
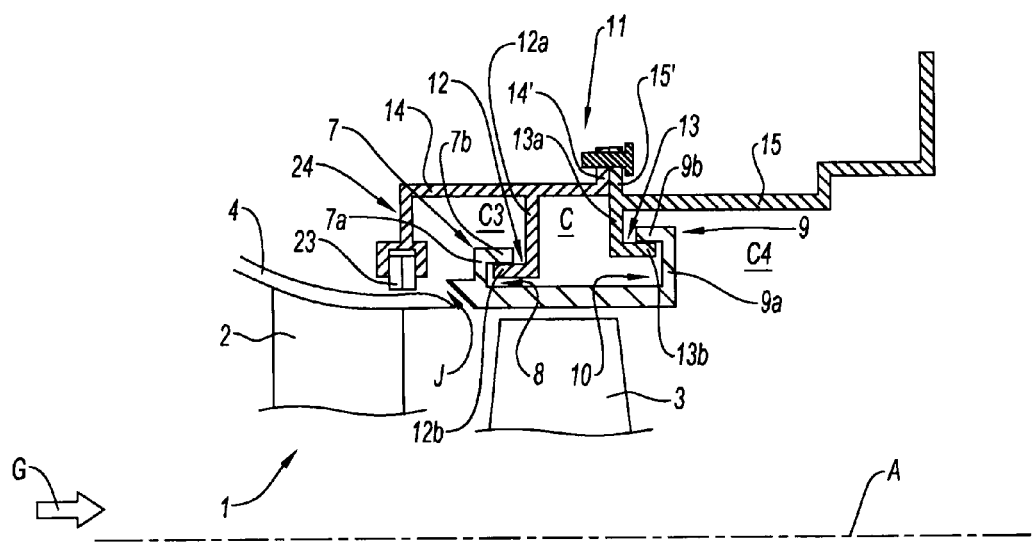
FIG. 3 is a schematic view in axial section of a turbine ring and of its supporting device according to a second preferred embodiment of the invention.

Unlike the embodiment of FIGS. 1 and 2, in which the upstream 8 and downstream 10 grooves have the same dimensions (the radii of their longitudinal walls 7b, 9b being equal), the upstream 8 and downstream 10 grooves of the embodiment of FIG. 3 do not have the same dimensions, the radius of the longitudinal wall 9b of the downstream shoulder 9 forming the downstream groove 10 being greater than the radius of the longitudinal wall 7b of the upstream shoulder 7 forming the upstream groove 8; since the longitudinal wall 6 of the ring 5 is parallel to the axis A of the turboshaft engine, the radial dimension of the radial wall 9a of the downstream shoulder 9 forming the downstream groove 10 is therefore greater than the radial dimension of the radial wall 7a of the upstream shoulder 7 forming the upstream groove 8. The longitudinal wall 13b of the downstream hook 13 thus extends at a radial distance from the axis A of the turboshaft engine which is greater than the longitudinal wall 12b of the upstream hook 12 (the longitudinal walls 12b, 13b of the hooks 12, 13 resting in the upstream 8 and downstream 10 grooves close to the longitudinal walls 7b, 9b of the shoulders 7, 9 forming these grooves 8, 10). These differences in radius allow mounting of the assembly as explained below.

Mounting of the ring 5 and of its supporting device 11 will now be described, more particularly with reference to FIGS. 4a, 4b and 4c. In contrast to the mounting described in relation to FIGS. 1 and 2, mounting is not performed by sliding the supporting parts one over the other and shrink fitting but rather by sliding the supporting parts relative to the ring and screwing.

Figure 4A:
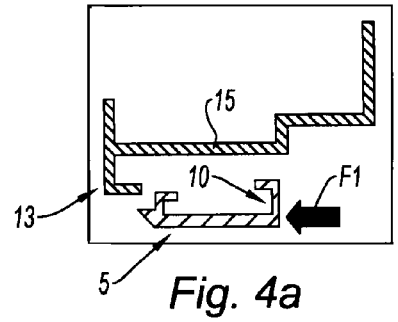
FIGS. 4a to 4c are schematic representations of the various steps involved in mounting the ring and the supporting device of FIG. 3.

With reference to FIG. 4a, during a first step, the downstream supporting part 15 is mounted with the ring 5 by way of a relative movement of the ring 5 from downstream to upstream relative to this part 15 (this relative movement is symbolized by arrow F1), thus allowing the downstream hook 13 to be accommodated in the downstream groove 10 of the ring 5.

Figure 4B:
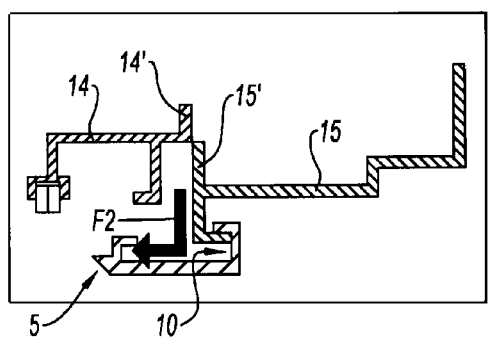

With reference to FIG. 4b, during a second step, a first sector of the upstream supporting part 14 is mounted with the ring 5 by a relative movement of this sector 14 from the outside towards the inside then from downstream to upstream relative to the assembly formed by the ring 15 and the downstream supporting part (this relative movement is symbolized by arrow F2), thus allowing the upstream hook 12 to be accommodated in the upstream groove 8 of the ring 5.

Figure 4C:
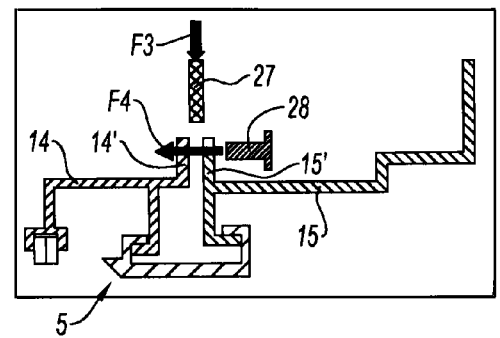

With reference to FIG. 4c, during a third step, a spacer 27, not shown in FIG. 3, annular in shape and corresponding circumferentially to the upstream supporting part 14 sector, is inserted between a downstream flange 14' of the upstream supporting part 14 and an upstream flange 15' of the downstream supporting part 15, to maintain their spacing (movement of the spacer 27 is symbolized by arrow F3). The upstream 14 and downstream 15 supporting parts are then fixed firmly to one another by screws 28 (the movement of which is symbolized by arrow F4) provided to fix to one another the flanges 14', 15' of the supporting parts 14, 15 and the spacer 27 inserted between them.

Finally, the second and third steps are repeated for the other upstream supporting part 14 sector, in order to complete this upstream supporting part 14 over the entire periphery of the ring 5.

Thanks to this embodiment of the invention, it is in particular possible to hold a one-piece turbine ring 5 in position with annular, overall axisymmetrical hooks 12, 13, unlike the prior art in which the one-piece rings are maintained with arms exerting their action in punctiform or discrete manner. Consequently, the deformation undergone by the one-piece ring 5 is axisymmetrical and therefore simpler to model.

The invention claimed is:

1. A supporting device for a ring of a gas turbine, the ring configured to enclose moving blades of the turbine driven by a gas flow flowing from upstream to downstream, the device comprising:
    at least one upstream hook, facing upstream, configured to be accommodated in an upstream groove of the ring, which groove is open in the downstream direction;
    at least one downstream hook, facing downstream, configured to be accommodated in a downstream groove of the ring, which groove is open in the upstream direction;
    a pressurized cavity formed between the upstream hook and downstream hook, the pressurized cavity being supplied with cooling gases; and
    at least one of means for injecting cooling gases for cooling the upstream hook positioned upstream of the upstream hook, and means for injecting cooling gases for cooling the downstream hook downstream of the downstream hook; arranged so that this injection is done without going through the pressurized cavity.

2. An aggregate constituted by a device as claimed in claim 1, and a turbine ring, the turbine ring comprising:
    an upstream groove, which groove is open in the downstream direction, and an downstream groove, which groove is open in the upstream direction, in which at least one of the upstream groove of the ring includes a curvilinear surface for contact with the upstream hook and the downstream groove of the ring includes a curvilinear surface for contact with the downstream hook.

3. An aggregate as claimed in claim 2, further comprising at least one of at least one upstream seal arranged to ensure gas-tightness between the ring and the upstream hook, the upstream seal being accommodated in the upstream groove of the ring, and/or at least one downstream seal arranged to ensure gas-tightness between the ring and the downstream hook, the downstream seal being accommodated in the downstream groove of the ring.

4. An aggregate as claimed in claim 2, further comprising an upstream supporting part comprising the upstream hook and a downstream supporting part comprising the downstream hook, in which the upstream supporting part and downstream supporting part are in one piece and the ring is sectorized into at least two ring sectors.

5. An aggregate as claimed in claim 4, in which the upstream supporting part and downstream supporting part are arranged to be mounted with the ring by sliding the supporting parts one on the other and by shrink fitting.

6. An aggregate as claimed in claim 2, further comprising an upstream supporting part comprising the upstream hook and a downstream supporting part comprising the downstream hook, in which the ring is in one piece, the downstream supporting part is in one piece, and the upstream supporting part is sectorized into at least two upstream supporting part sectors.

7. A turbine comprising a supporting device in accordance with the device of claim 1.

8. A turboshaft engine comprising a turbine in accordance with the turbine of claim 7.

* * * * *